United States Patent [19]
Baker
[11] 4,128,535
[45] Dec. 5, 1978

[54] METHOD FOR REDUCING COLOR FORMATION IN POLYESTERS

[75] Inventor: Melvin C. Baker, Youngstown, Ohio
[73] Assignee: E. I. Du Pont de Nemours and Company, Wilmington, Del.

[21] Appl. No.: 834,829
[22] Filed: Sep. 19, 1977
[51] Int. Cl.[2] .............................................. C08G 63/16
[52] U.S. Cl. .................................... 528/272; 528/302; 528/273
[58] Field of Search ................. 260/75 M, 75 T, 75 R

[56] References Cited

U.S. PATENT DOCUMENTS

| | | | |
|---|---|---|---|
| 3,487,049 | 12/1969 | Busot | 260/75 M |
| 3,714,126 | 1/1973 | Reid | 260/75 R |
| 3,803,210 | 4/1974 | Rod et al. | 260/75 M X |
| 3,859,257 | 1/1975 | Schade et al. | 260/75 M |

*Primary Examiner*—Lucille M. Phynes

[57] ABSTRACT

Color formation in a polyester formed of a saturated acid, a glycol and 1,4-butanediol can be reduced if, during preparation of the polyester, a reaction mass is first formed of the acid and the glycol and the butanediol is then added to the reaction mass after the acid-glycol reaction is practically complete.

3 Claims, No Drawings

METHOD FOR REDUCING COLOR FORMATION IN POLYESTERS

BACKGROUND AND SUMMARY OF THE INVENTION

Polyesters formed of saturated acids, ethylene glycol or propylene glycol and 1,4-butanediol are widely used in industry as starting materials in the preparation of polyurethanes. Such polyesters are ordinarily made in batch processes wherein the acid, the glycol and the diol are brought together simultaneously under conditions suitable for condensation polymerization to take place. Polyesters thus prepared show varying degrees of color formation, which is undesirable in most instances because the color may be carried over into the polyurethane product.

It has now been found, according to the present invention, that color formation in such a polyester can be significantly reduced if the polyester is prepared by first forming a reaction mass of the acid and the glycol and then adding the butanediol to the mass when the acid-glycol reaction is practically complete.

DETAILED DESCRIPTION OF THE INVENTION

The saturated dibasic acids which can be used to prepare polyesters according to the invention are adipic acid, glutaric acid and succinic acid. Adipic acid is preferred for the properties it confers on the product. Mixtures of acids can also be used.

The glycol used can be either ethylene glycol, 1,2-propylene glycol or 1,3-propylene glycol, although ethylene glycol is preferred, also for the properties it confers on the product. Mixtures of glycols can also be used.

Any grade of acid, glycol or 1,4-butanediol, ordinarily used in preparing polyesters, can be used in the process of the invention.

Although the proportions of acid, glycol and butanediol reactants used to prepare the polyesters can be any within conventional ranges, the reactants are ordinarily and preferably used in acid/glycol/butanediol mol ratios of 1/1.1-1.3/0.35-0.5. As is well known to those skilled in this art, the proportions of reactants used will vary with the molecular weight desired of the polyester product.

The process of the invention is carried out by first charging a reaction vessel with a proper amount of glycol. The vessel is then filled with nitrogen and a proper amount of acid is added, with stirring. Phosphoric acid, 20 to 30 ppm, is added as a catalyst and the resulting reaction mass is then heated to and held at 230° to 250° C., preferably about 240° C., for 8 to 12 hours, with continuous stirring. During this reaction period, volatiles evolved from the reaction mass are continuously withdrawn from the vessel. At the end of the period, the acid-glycol reaction is practically complete, which means that only an insignificant amount of free acid remains in the mass.

The proper amount of butanediol is then added to the reaction mass, with stirring. This addition tends to depress the temperature of the mass, so more heat must be applied to compensate.

When the temperature of the reaction mass has stabilized at 200° to 250° C., preferably 225° to 240° C., tetraisopropyl titanate (1 to 2 ppm of titanium) is added. The mass is then held at about 235° to 245° C. while a vacuum of 5 to 15 mm of mercury is drawn and held on the vessel. This vacuum is held for about 5 hours, or until evolution of volatiles from the reaction mass ceases.

The reaction is then stopped by discontinuing heating and then pressurizing the vessel with nitrogen. Preparation of the polyester according to the invention is then complete.

The polyester thus produced will have significantly less color formation than the same type of polyester conventionally prepared. For example, polyesters prepared according to the invention will generally have APHA color values of about 100 or less, while conventionally prepared polyesters of the same type may have APHA color values as high as 400 to 500. Color is measured by the system developed by the American Public Health Association (APHA), using a standard colorimeter, a 40 mm × 20 mm cell and a number 42 blue filter. The colorimeter is calibrated according to ASTM D-1209-62, using a solution of platinum-cobalt APHA 500 color standard SOP-120 made by the Fisher Co.

EXAMPLE

In the following example, all parts are by weight.

A reactor was charged with 1,050 parts of ethylene glycol, and then purged with nitrogen. Adipic acid, 2,000 parts, was added to the glycol, with stirring, followed by the addition of 0.25 part of phosphoric acid in 2 parts of ethylene glycol.

The resulting reaction mass was heated to 240° C. and held there, with continuous stirring, for 1 hour, during which period evolved volatiles were continuously withdrawn from the vessel.

1,4-Butanediol, 600 parts, was then added to the reaction mass, with stirring, and the temperature of the mass was brought back to 240° C. Tetraisopropyl titanate, 0.02 part in 2 parts of ethylene glycol, was then added.

A vacuum of 10 mm of mercury was drawn on the vessel and the temperature of the reaction mass was held at 240° C. for 4 hours, during which period evolved volatiles were again withdrawn from the vessel.

Heating was then discontinued and the vessel was filled with nitrogen.

The resulting polyester had an APHA color value of 46. A polyester of the same composition, made according to a conventional process in which the acid, glycol and butanediol were charged to the reaction vessel simultaneously, had an APHA color value of 208.

I claim:

1. In the preparation of a polyester wherein adipic acid, glutaric acid or succinic acid or mixtures thereof; ethylene glycol, propylene glycol or mixtures thereof; and 1,4-butanediol are brought together under conditions suitable for condensation polymerization, a method for reducing undesirable color formation in the polyester product, the method consisting essentially of first forming a reaction mass of the acid and the glycol and then adding the butanediol to the reaction mass after the reaction between the acid and the glycol is practically complete.

2. The method of claim 1, wherein the polyester is formed of adipic acid, ethylene glycol and 1,4-butanediol.

3. The method of claim 2 wherein the acid, glycol and 1,4-butanediol are used in mol ratios of 1/1.1–1.3/0.-35–0.5.

* * * * *